United States Patent [19]

Kato et al.

[11] Patent Number: 4,630,899
[45] Date of Patent: Dec. 23, 1986

[54] ZOOM LENS HAVING MOVABLE DIAPHRAGM

[75] Inventors: Masatake Kato, Tokyo; Keiji Ikemori, Kanagawa, both of Japan

[73] Assignee: Canon Kabushiki Kaisha, Tokyo, Japan

[21] Appl. No.: 532,577

[22] Filed: Sep. 15, 1983

[30] Foreign Application Priority Data

Sep. 18, 1982 [JP] Japan .................. 57-162660

[51] Int. Cl.⁴ .................. G02B 15/14; G02B 15/15
[52] U.S. Cl. .................. 350/427; 350/423
[58] Field of Search .................. 350/427, 423, 450

[56] References Cited

U.S. PATENT DOCUMENTS

| | | | |
|---|---|---|---|
| 4,232,942 | 11/1980 | Ikemori | 350/423 |
| 4,348,082 | 9/1982 | Ogawa | 350/423 |
| 4,506,958 | 3/1985 | Imai | 350/427 |

Primary Examiner—John K. Corbin
Assistant Examiner—Rebecca D. Gass
Attorney, Agent, or Firm—Toren, McGeady, Stanger, Goldberg & Kiel

[57] ABSTRACT

In the disclosed zoom lens, a varifocal lens system includes a positive first component at the object end of the system and is movable closer to the object in a telephoto position than in a wide angle position. A diaphragm on the image end of the varifocal lens system is movable during zooming and the location of the diaphragm in the telephoto position is closer to the object than in the wide angle position.

7 Claims, 7 Drawing Figures

DIAPHRAGM

DIAPHRAGM

DIAPHRAGM

PRESENT INVENTION

DIAPHRAGM

PRESENT INVENTION

ZOOM LENS HAVING MOVABLE DIAPHRAGM

BACKGROUND OF THE INVENTION

1. Field of the Invention

This invention relates to zoom lenses having a movable diaphragm, and more particularly to zoom lenses with a positive first lens component in the front of a varifocal lens system, and a diaphragm in the rear of the varifocal system arranged to move with the first lens component during a zooming operation.

2. Description of the Prior Art

A zoom lens in which a diaphragm is movable with another lens component when zooming is disclosed in U.S. Pat. No. 3,848,969.

This zoom lens is of the so-called two-component type. It includes a front component of negative power and a rear component of positive power with the air separation therebetween being changed to effect zooming. When zooming, the diaphragm is moved. In this lens, the air separation between the components is effectively utilized to achieve minimization of the bulk and size of the zoom lens.

In this type of zoom lens, however, a significant increase in the zoom ratio leads to a tendency to increase the bulk and size of the lens system. Therefore, the use of such an arrangement in high range zoom lens is not very desirable.

In two-component zoom lenses, it is usual to arrange the diaphragm either at an intermediate point in the space between the negative first and positive second components, or in a space within the second component. On the other hand, in order to allow the diaphragm to be stationary during zooming, its mechanical interference with the adjacent components may be avoided by providing for a sufficient air space. When the diaphragm is positioned between the front and rear parts of the second component the operating mechanism must be constructed so as to impart the same movement to the front and rear parts. This tends to wastefully increase the air space and make the structure unduly complicated.

Another type of zoom lens is the so-called four-component type. It includes from front to rear, a first component for focusing, second and third components for zooming, and an image forming or fourth component. Generally, its diaphragm is arranged just to the rear of the third component and is stationary during zooming. Such a lens is disclosed, for example, in U.S. Pat. No. 3,970,367. The four-component zoom lens has a longer distance between the diaphragm and the image plane than the two-component zoom lens. This leads to a tendency to increase the necessary number of mechanical members in the signal transmission from the interior of a camera housing to the diaphragm and the complexity of the transmission. However, the bulk and size of the zoom lens system can be reduced to some extent by moving the diaphragm during zooming. Nevertheless, with the four-component type, similar to the two-component type zoom lens, when the range of variation of the image magnification of the zoom lens is substantially increased, a rapid increase in the bulk and size of the lens system results.

SUMMARY OF THE INVENTION

An object of the present invention is to provide a zoom lens having a high range while still permitting a reduction of the bulk and size to be facilitated.

To achieve this according to, a feature of the present invention a plurality of components constitute a varifocal system wherein there is arranged at the frontmost side a first component of positive refractive power, the first component is arranged to move forward as zooming is performed from the wide angle to the telephoto position, and that a movable diaphragm is arranged at the rear (on the image side) of the varifocal lens assembly, and the movable diaphragm is made to shift with zooming in the same direction in which the first component moves.

It is to be noted here that the term "components" that constitute the varifocal lens system herein used means the component movable when in zooming, and also a component, even though it remains stationary during zooming, whose image magnification (lateral magnification) varies with zooming.

In the following, the present invention will be described in greater detail by using the drawings, and further features of the invention will beocme apparent from this description.

DESCRIPTION OF THE PREFERRED EMBODIMENT

Zoom lens whose first component is movable for zooming, like the zoom lens of the invention, have been optically compensated as, for example, proposed in U.S. Pat. No. 4,232,942 and Japanese Patent Publication No. Sho 49-23911 and the mechanically compensated as proposed in U.S. Pat. No. 3,481,666, Japanese Patent Publication No. Sho 44-14877 and U.S. Pat. No. 4,348,082.

In designing these zoom lenses, determination of the diameter of the front members of the first component is generally made by considering the pencil to the extra-axial image points of an object at a minimum distance (hereinafter referred to as "M.O.D.") when in the telephoto or longest focal length position. A detailed explanation is given below by reference to FIGS. 1(a) to 1(d).

Figure 1A:
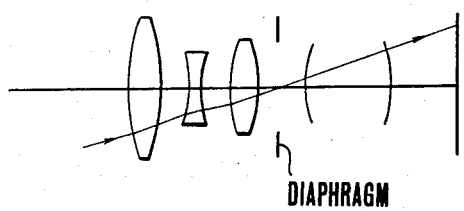
FIGS. 1(a) and 1(b) are schematic diagrams of a conventional zoom lens showing respective tracings of a principal ray of the oblique pencil in the wide-angle and telephoto positions for an object at infinity.
Figure 1B:
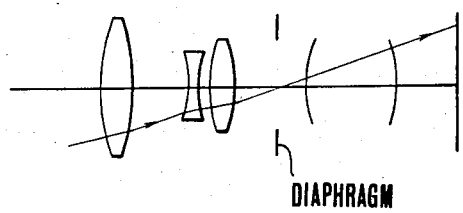
Figure 1C:
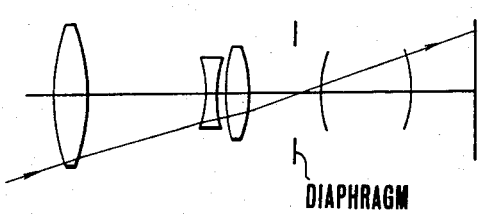
FIG. 1(c) shows the ray for the zoom lens in the the telephoto position for an object at the minimum distance.

FIGS 1(a) to 1(d) illustrate a varifocal system constructed with a first component of positive power, a second component of negative power and a third component of positive power in the form of either the mechanical or the optical compensated type where the first and third components are moved as a unit when zooming. FIGS. 1(a) and 1(b) showing the wide-angle and telephoto positions respectively illustrate the tracing of a principal ray of the oblique pencil. FIG. 1(c) illustrates tracing of the same ray but after the first component is moved forward from the position of FIG. 1(b) to focus at the M.O.D. As is evident from FIGS. 1(a) to 1(c), the required value of the diameter of the front member of the first component becomes largest in the position of FIG. 1(c). Conversely, the diameter of the front member of the first component has to be based on the condition of FIG. 1(c). In general, the first component because of its focusing function is made up of a large number of members in a complicated form to stabilize aberration correction throughout the focusing range. Hence its total weight is often as heavy as a third or more of the weight of the entire lens system.

Reducing the diameter of the front member not only results in greater compactness of the lens system as a whole, but also gives rise to the advantage that the weight can be minimized and the production cost lowered.

Figure 1D:
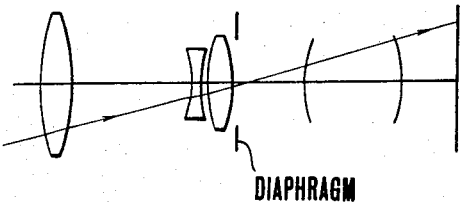
FIG. 1(d) illustrates the zoom lens of the invention in the telephoto position with object at the minimum distance.

In the present invention, the diaphragm positioned rearwardly of the first component is made to move in the same direction as that in which the first component moves in response to zooming operation. Hence the height of incidence of the principal ray that is to pass through the center of the aperture opening of the diaphragm to an extra-axial image point is decreased. This permits minimizing the diameter of the front member, and many of the rays under the central pencil of the diaphragm aperture can reach the image plane, thus contributing to an increase in the corner illumination of the picture frame. FIG. 1(d) illustrates how far the height of incidence of the ray for the M.O.D. in the telephoto position is lowered by employing the invention. As is evident from that drawing, the concurrent movement of the diaphragm makes it possible to minimize the diameter of the front member.

In the zoom lens of the present invention, to compromise the requirements of facilitating achievement of a valuable increase in the range of image magnifications and of achieving a great advance in the minimization of the bulk and size of the entire lens system, the front or first component of the varifocal section is made positive in refractive power, and made movable with zooming to take part in the extension of the range and also to reduce the diameters of the other components that follow the first component.

In particular, in the present invention the varifocal section is constructed from a first component, counting from the front, of positive refractive power, a second component of negative refractive power and a third component of positive refractive power with the diaphragm positioned in rear of the third component, and the first and third components and the diaphragm are arranged to move forward when zooming from the wide-angle to the telephoto position. Hence the requirement of extending the zooming range is easily fulfilled, which results in a greater minimization of the bulk and size of the entire lens system.

It should be pointed out that if the zoom lens of the invention is made to take the optically compensated form where the second component is held stationary during zooming, while the first and third components are moved linearly to effect zooming, additional advantages are produced in that the structure of the operating mechanism for the components is simplified and that sufficiently high optical performance is also obtained.

A numerical specific example of the present invention will next be given in Table 1, which refers to FIG. 2. for the radius of curvature of the i-th lens surface, $R_i$, the air separation or lens thickness between the i-th and (i+1)th lens surfaces, $D_i$, the refractive index of the glass material of the i-th lens element for the spectral d line, $N_i$, and the Abbe number of the glass material of the i-th lens element, $\nu_i$.

TABLE 1

| $f = 72.0-145.1$ | FNO 1:4.5 | $2\omega = 37.16°-18.84°$ | |
|---|---|---|---|
| R1 = 127.524 | D1 = 9.0 | N1 = 1.66672 | ν1 = 48.3 |
| R2 = −66.109 | D2 = 2.5 | N2 = 1.7552 | ν2 = 27.5 |
| R3 = −245.758 | D3 = Variable | | |
| R4 = −136.158 | D4 = 1.35 | N3 = 1.60311 | ν3 = 60.7 |
| R5 = 60.767 | D5 = 2.44 | | |
| R6 = −64.282 | D6 = 1.35 | N4 = 1.60311 | ν4 = 60.7 |
| R7 = 50.461 | D7 = 3.5 | N5 = 1.7552 | ν5 = 27.5 |
| R8 = −5835.54 | D8 = Variable | | |
| R9 = 226.548 | D9 = 3.47 | N6 = 1.60311 | ν6 = 60.7 |
| R10 = −68.358 | D10 = 0.15 | | |
| R11 = 62.124 | D11 = 1.4 | N7 = 1.7552 | ν7 = 27.5 |
| R12 = 29.935 | D12 = 4.4 | N8 = 1.60311 | ν8 = 60.7 |
| R13 = 338.354 | D13 = 4.4 | | |
| R14 = Stop | D14 = Variable | | |
| R15 = −48.874 | D15 = 1.2 | N9 = 1.53996 | ν9 = 59.5 |
| R16 = 23644.7 | D16 = 0.15 | | |
| R17 = 38.239 | D17 = 3.31 | N10 = 1.66755 | ν10 = 41.9 |
| R18 = −1218.25 | D18 = 5.74 | | |
| R19 = −134.584 | D19 = 1.1 | N11 = 1.6398 | ν11 = 34.5 |
| R20 = 35.217 | D20 = 6.61 | | |
| R21 = 239.927 | D21 = 3.23 | N12 = 1.6935 | ν12 = 53.2 |
| R22 = −48.356 | | | |
| f | 72.0 | 108.06 | 145.14 |
| D3 | 5.012 | 20.568 | 31.598 |
| D8 | 29.575 | 14.019 | 2.989 |
| D14 | 1.0 | 16.556 | 27.586 |

Though this numerical specific example has been described as adapted to the optically compensated zoom lens in which the first and third components are moved as a unit, the second component may be otherwise made movable non-linearly to form a mechanically compensated zoom lens. Even in this case, the object of the present invention can be readily accomplished.

Figure 2:
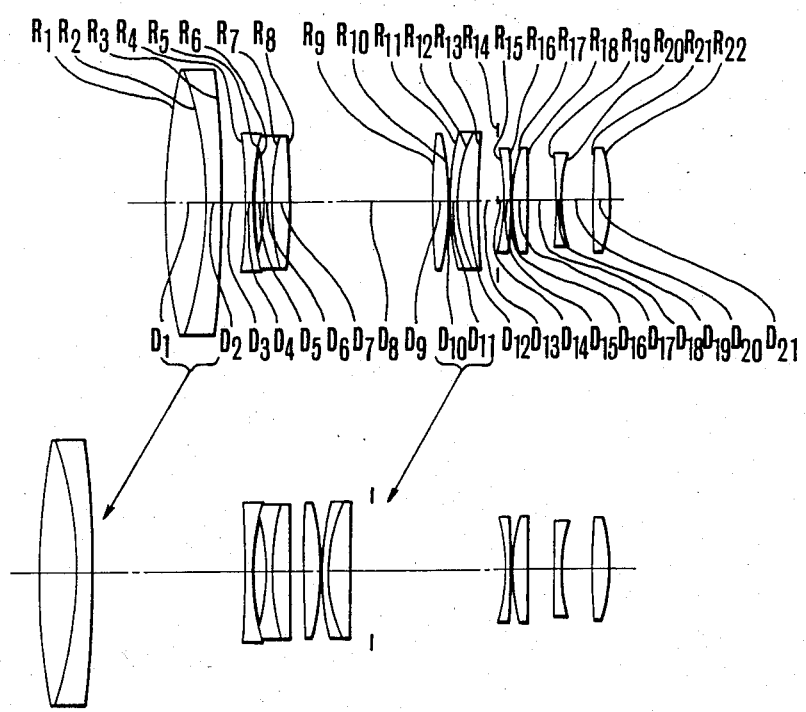
FIG. 2 is a longitudinal section view of an example of a specific lens of the invention.
Figure 3A:
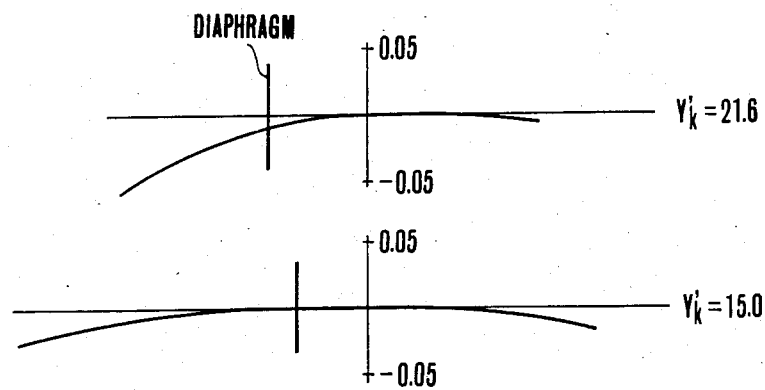
FIGS. 3(a) and 3(b) are graphic representations of the lateral aberrations of the meridional cross-section about the example of prior art where the diaphragm is held stationary during zooming and the numerical specific example of the invention where the diaphragm is moved.
Figure 3B:
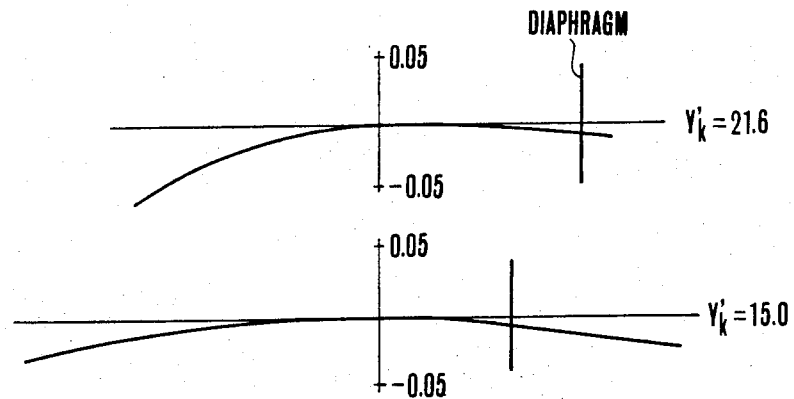

FIG. 2 is a lens block diagram of the numerical specific example of the invention, and FIG. 3 shows lateral aberration curves of the meridional cross-section of the lens system of FIG. 2 in comparison with a lens system where the diaphragm is otherwise held stationary during zooming. Further shown in Table 2 are the heights (h) at which the paraxial pupil ray cuts the successive lens surfaces for the prior art in the left hand column and for the present invention in the right hand column.

In FIG. 2, the lenses identified by the thickness D15, D17, D19, and D1, remain stationary during zooming.

TABLE 2

| Lens Surface (No.) | Prior Art (/H) | Present Invention (/H) |
|---|---|---|
| 1 | −0.946 | −0.567 |
| 2 | −0.882 | −0.514 |
| 3 | −0.867 | −0.501 |
| 4 | −0.446 | −0.162 |
| 5 | −0.437 | −0.154 |
| 6 | −0.419 | −0.133 |
| 7 | −0.417 | −0.127 |
| 8 | −0.408 | −0.112 |
| 9 | −0.395 | −0.089 |
| 10 | −0.383 | −0.072 |
| 11 | −0.382 | −0.071 |
| 12 | −0.371 | −0.064 |

TABLE 2-continued

| Lens Surface (No.) | Prior Art (/H) | Present Invention (/H) |
| --- | --- | --- |
| 13 | −0.340 | −0.039 |
| 14 | 0.000 | 0.000 |
| 15 | 0.010 | 0.247 |
| 16 | 0.019 | 0.256 |
| 17 | 0.021 | 0.257 |
| 18 | 0.042 | 0.272 |
| 19 | 0.104 | 0.312 |
| 20 | 0.111 | 0.318 |
| 21 | 0.198 | 0.412 |
| 22 | 0.223 | 0.437 |

It is evident from FIG. 3 and Table 2 that making the diaphragm move with zooming allows, the diameter of the front lens member to be made smaller. This affords the advantages that the weight of the zoom lens is reduced, a great advance in the compactness is achieved, and that the lillumination of the corners of the image format can be also increased. Also since the invention creates room to increase the diameter of the front member, the first component can be made to move further forward for zooming purposes, thus assisting in extending the zooming range. Further the increased total axial movement of the first component implies that the focusing range may be extended toward shorter object distances.

What we claim:

1. A zoom lens comprising:
a varifocal lens system having a plurality of lens components, said lens system including a front component having a positive refractive power and arranged frontmost in the system and a lens component positioned furthest toward the image, wherein positions at which said front lens component and rear lens component lie are more forward in a telephoto setting than at a wide-angle setting; and
a diaphragm on the image side of said rear lens component and movable with zooming so that the position of said diaphragm in the telephoto setting is further forward in the wide-angle setting.

2. A zoom lens according to claim 1, further comprising a lens group stationary during zooming on the image side of said diaphragm.

3. A zoom lens according to claim 1, wherein the rear lens component and the diaphragm move with a constant spacing therebetween during the zooming.

4. A zoom lens comprising:
a varifocal lens system having a plurality of lens components, said lens system including, from front to rear, a first component having a positive refractive power, a second component having a negative refractive power and a third component having a positive refractive power, and positions at which said first component and said third component lying more forward at telephoto setting than those at wide-angle setting; and
a diaphragm arranged on the image side of said varifocal lens system to move when zooming, said diaphragm lying in a more forward position at telephoto setting than that at wide-angle setting.

5. A zoom lens as in claim 4, wherein said second component is arranged to be held stationary during zooming, and said first and said third components are arranged to be moved linearly to effect zooming.

6. A zoom lens as described in claim 4, wherein said zoom lens further includes a lens component which remains stationary during zooming is arranged to the rear of said diaphragm.

7. A zoom lens comprising:
a varifocal lens system formed with a first lens component of positive refractive power, a second lens component of negative refractive power and a third lens component of positive refractive power arranged successively in this order from front to rear, said first lens component and said third lens component being arranged so that during zooming from a wide-angle position to a telephoto position said first lens component and said third lens component move from the image side to the object side;
a diaphragm arranged on the image side of said varifocal lens system, said diaphragm being arranged to move from the object side to the image side when zooming from the wide-angle position to the telephoto position; and
a lens component on the image side of said diaphragm and arranged to remain stationary during zooming.

* * * * *